United States Patent

[11] 3,592,015

[72] Inventors: Martin Streich, Niedereschbach, Kreis Friedberg; Heiner Tanz, Dornigheim (Main), both of, Germany
[21] Appl. No.: 785,213
[22] Filed: Dec. 19, 1968
[45] Patented: July 13, 1971
[73] Assignee: Messer Griesheim GmbH, Frankfurt am Main, Germany
[32] Priority: Dec. 21, 1967
[33] Germany
[31] P 16 19 728.7

[54] RECTIFICATION COLUMN WITH TWO COMPONENT CLOSED HEAT EXCHANGE CYCLE
11 Claims, 2 Drawing Figs.

[52] U.S. Cl. ................................................. 62/28, 62/40, 62/24
[51] Int. Cl. ................................................. F25j 3/02, F25j 3/06, F25j 1/00
[50] Field of Search .......................................... 62/23, 24, 27, 28, 40

[56] References Cited
UNITED STATES PATENTS

| | | | |
|---|---|---|---|
| 1,853,743 | 5/1932 | Pollitzer | 62/40 |
| 3,173,778 | 4/1965 | Gaumer | 62/40 |
| 3,274,787 | 9/1966 | Grenier | 62/23 |
| 3,393,527 | 7/1968 | Swenson | 62/28 |
| 3,509,728 | 5/1970 | Mercer | 62/40 |

OTHER REFERENCES

Kleemenko, " One Flow Cascade Cycle" in PROGRESS IN REFRIGERATION SCIENCE AND TECHNOLOGY, Volume I Pergamon Press 1960 pps. 34— 39

Primary Examiner—Norman Yudkoff
Assistant Examiner—Arthur F. Purcell
Attorney—Connolly and Hutz ABSTRACT: A rectification process for separating mixtures of individual components whose boiling temperatures or vapor pressure curves are far apart wherein for the intensification of the rectification, the column adsorption layer is heated with a circulating gas and the column head is cooled with a circulating gas; is characterized by having as the circulating gas a multicomponent mixture consisting of at least two individual components, by means of which, after it is compressed, the column adsorption layer is heated, whereby the mixture is partially condensed, whereupon it is separated in a separator into a liquid phase with preponderantly difficulty boiling components and into a vapor phase with preponderantly easily boiling components, whereupon the vapor phase through heat exchange is condensed with expanded and vaporizing liquid phase and cools the column head after expansion, and that finally after expansion to the suction pressure and mixing, the original multicomponents mixture is again prepared and conducted to the compressor.

RECTIFICATION COLUMN WITH TWO COMPONENT CLOSED HEAT EXCHANGE CYCLE

BACKGROUND OF THE INVENTION

This invention relates to a process for the separating of mixtures of individual components whose boiling temperatures or vapor pressure curves are far apart.

Such a mixture for example is a gas mixture of ethylene ($C_2H_4$) and a more difficulty or higher boiling one, and methane ($Ch_4$) and a more easily or lower boiling one. Along the entire pressure range there exists a temperature difference between the vapor pressure curves of both pure components $CH_4$ and $C_2H_4$ of about 75° C. at 1 absolute pressure up to about 86° C. at 45 absolute pressure.

A complete separator into both $CH_4$—or $C_2H_4$—containing fractions can be achieved by a rectification at low temperatures. For the operation of such a rectification column a heating of the column absorption layer or bottom is required for producing the vapor lift on $C_2H_4$ in the column and a cooling of the column head is required for producing the necessary reflux on the liquid $CH_4$. This heating and cooling is generally effected by one or several gas cycles.

Because of the great temperature difference between pure ethylene and pure methane, the previous use of a single cycle for the simultaneous absorption layer heating and head cooling of the column appears to be of little significance, since the cycle compressor must then raise a great pressure difference corresponding to the great temperature difference, although the use per se of only one cycle is worthy of effort in order to simplify the equipment. To avoid this difficulty, the column is heated with an open or a closed $C_2H_4$ cycle or even with the condensing crude gas current. The cooling of the head is similarly produced by means of a $CH_4$ cycle. Both cycles can be in the heat exchange, so that there results a cooling cascade. In separating under high pressure, $C_2H_4$-$C_3H_8$ cooling cascades are also introduced.

In general, the following requirements are made of a cycle:

1. The necessary pressure ratio in a given amount should be as small as possible, so that the power required of the compressor remains small.

2. The evaporation or condensation temperatures, which are preferably utilized in a cycle, should be as great as possible, could be completely utilized, and in magnitude correspond to the various pressure altitudes, so that for large transported cooling amounts only small amounts of cycle gas must be converted.

3. A cycle should be in a position, taking into consideration items 1 and 2, to be able to transport amounts of heat as reversibly as possible over wide temperature ranges.

In the rectification of mixtures of individual components whose boiling temperatures are far apart, these requirements are not fulfilled for the advantageous introduction of one or several cycles. The use for example of a single $CH_4$-cycle for the heating of the absorption layer and cooling of the head in the rectification of a $CH_4$-$C_2H$ mixture has the following disadvantages:

As already mentioned above, the compressor must provide the pressure difference for the cycle gas which results from the temperature difference between heating of the adsorption layer and cooling of the head of the rectification. These are at least 30 absolute pressures, where the column pressure in this instance may not exceed 3 absolute pressures. This pressure difference is very big and corresponds to the power input. Furthermore, the evaporation or condensation temperatures are considerably greater in the lower pressure $p_1$ than in the higher pressure $p_2=p_1+30$ absolute pressure. Consequently, there results poor Q–T diagrams for the adsorption layer of the column, the deep cooling of the cycle medium, as well as for the head cooling of the column. In order to produce the necessary heating capacity in the adsorption layer heating at low condensation temperature, a greater cycle amount should be at one's disposal than is required for the head cooling where the cycle medium has a much greater heat of evaporation. The deep cooling of the condensed liquid is only possible through isothermal evaporation or the heating up of the cold gas stream from the head cooling or a combination of both possibilities. A poor Q–T diagram also occurs, since here a specific heat $cp$=0.36 to 0.38 kcal./Nm.$^{3°}$ C. for gaseous methane stands opposite a specific heat $cp$=0.57 to 1.10 kcal./Nm.

A single $C_2H_4$ cycle has the same disadvantages. In order to avoid them, a cooling cascade of a methane, and an ethylene cycle are often employed. However, a transmission of the cold from the ethylene cycle to a methane cycle always requires a pressure level of 30 absolute pressures in the methane cycle. This is a rejection of the above-named requirements for an advantageous construction of a cycle. Furthermore, in the cooling cascade two cycles with two compressor units and double measuring and regulating technique must be operated and taken care of.

SUMMARY OF THE INVENTION

The object of the invention is to carry out the rectification process of the stated type with only one cycle for the simultaneous adsorption layer heating and head cooling while taking into account the above-given requirements of such a cycle.

In addition, the object of the invention is to carry out such a rectification process eventually also with several individual cycles connected to the cooling cascade, wherein the above-named requirements set for a cycle are to be fulfilled.

A rectification process for the separating of mixtures of individual components has now been found wherein for the intensification or increasing of the rectification the column adsorption layer is heated with a circulating gas and the column head is cooled with a circulating gas, characterized, in that as the circulating gas there serve a multicomponent mixture, consisting of at least two individual components, by means of which, after it is compressed, the column adsorption layer is heated, whereby the mixture is partially condensed, whereupon it is separated in a separator into a liquid phase with preponderantly difficulty boiling components and into a vapor phase with preponderantly easily boiling components, whereupon the vapor phase through heat exchange is condensed with expanded and vaporizing liquid phase and cools the column head after expansion, and that finally after expansion to the suction pressure of the compressor and mixing, the original multicomponents mixture is again prepared and conducted to the compressor.

It is suitable to combine the multicomponent mixtures of such individual components which are contained in a mixture to be decomposed. The cold escape at the column can occur in several steps at different temperature levels. The invention can be employed both for open as well as for closed cycles. In all these variations the inventive thought has the advantage that the above-named requirements are all fulfilled in one gas cycle, which was impossible in the previous cycles and circuits.

Multicomponent mixture cycles have previously been employed only occasionally. French Pat. No. 1,302,989 discloses a process for fractional condensation of natural gas wherein an open multicomponent mixture cycle is employed. In this process a two-step condensation is necessary, however, since the cycle gas must be expanded to two different pressures. The use of a closed multicomponent mixture cycle for general cooling purposes is shown by U.S. Pat. No. 2,581,558.

THE DRAWINGS

Two embodiments of the invention are illustrated in the attached drawings.

FIG. 1 schematically illustrates the process of the rectification of a methane-ethylene mixture with a multicomponent mixture cycle with one-step partial condensation which simultaneously cools the column adsorption layer and cools the column head.

FIG. 2 also schematically illustrates the process scheme of the rectification of a methane-ethylene mixture with a multicomponent mixture cycle, wherein the cycle makes possible an additional cold escape at the column at an average temperature level.

DETAILED DESCRIPTION

Figure 1:
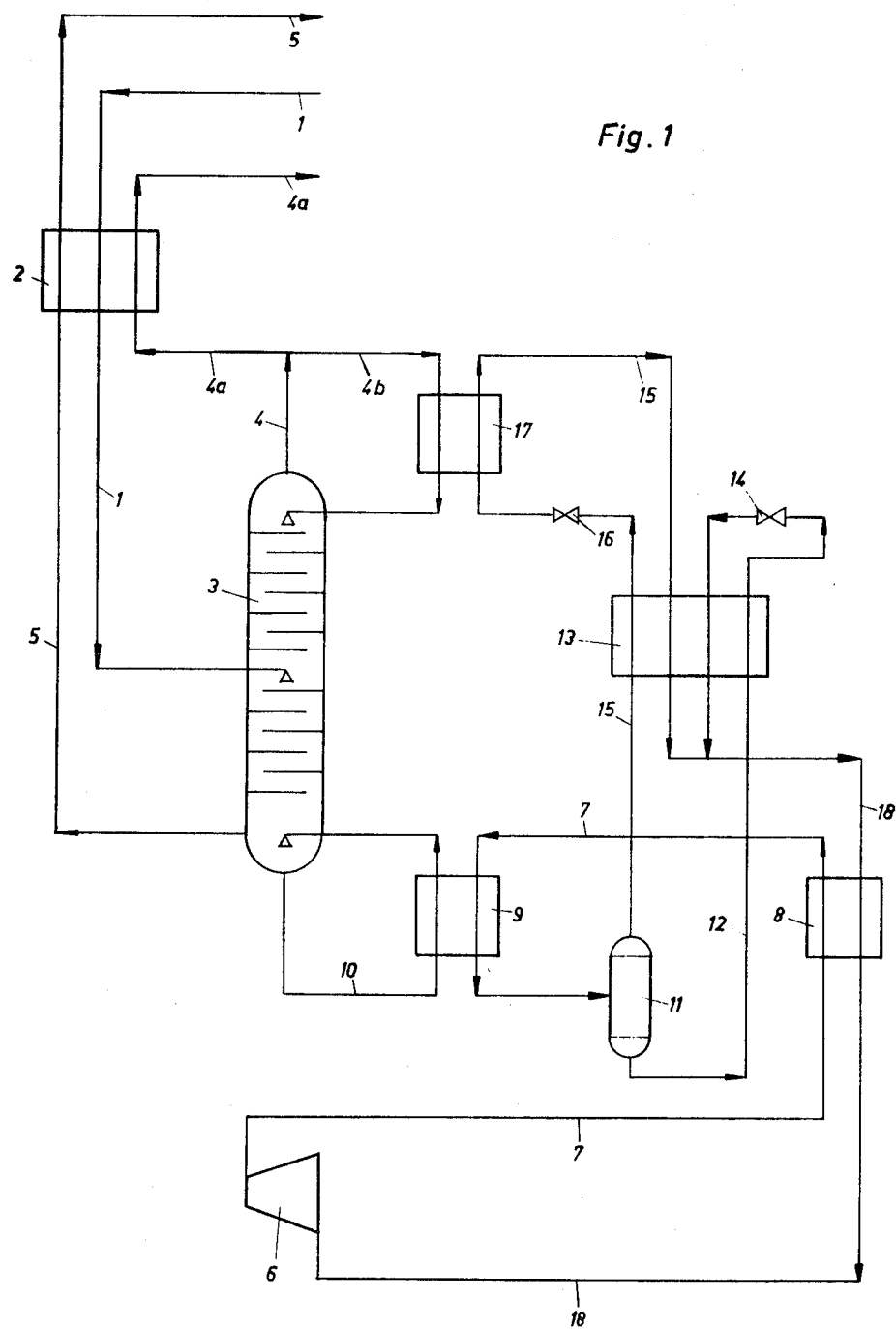

In the process according to FIG. 1, the crude gas consisting of a $CH_4$-$C_2H_4$ mixture passes over conduit 1 after cooling and partial condensation in heat exchanger 2 to column 3 where it is rectified under a pressure of 2.5 to 5 absolute pressures. The greatest possible rectification pressure here is therefore at 2 absolute pressures greater than in a single $CH_4$ cycle. The top product $CH_4$ passes off over the top of column 3 by way of conduit 4—4a through heat exchanger 2 in countercurrent to the crude gas to be cooled. From the adsorption layer of column 3 a liquid-vapor mixture of pure $C_2H_4$ is drawn off by way of conduit 5, vaporized in heat exchanger 2, and heated in countercurrent to the crude gas, and then passed off. Top cooling and adsorption layer heating of column 3 are taken over by a cycle whose cycle medium consists of a mixture of $CH_4$ and $C_2H_4$. In compressor 6 the cycle gas is compressed from 1 absolute pressure to 15—18 absolute pressures, conducted by way of conduit 7 to heat exchanger 8, where it is cooled in countercurrent to cold gas, and then to adsorption layer heating, where it is partially condensed. To the adsorption layer heating 9 there is conducted adsorption layer liquid by way of conduit 10 and conducted back again to the column adsorption layer. The partially condensed cycle gas in the adsorption layer heating 9 further passes by way of conduit 7 to separator 11, where it is separated into a vapor phase rich in methane and into a liquid phase rich in ethylene.

The liquid phase is drawn off from the separator by way of conduit 12, deep cooled in heat exchanger 13, expanded in choker valve 14, and finally vaporized in heat exchanger 13 in countercurrent to the condensing vapor phase. The vapor phase is drawn off from separator 11 by way of conduit 15, is condensed in heat exchanger 13, is expanded in choker valve 16 and is vaporized in heat exchanger 17. By way of conduit 4—4b, the top product passed to heat exchanger 17 wherein it is condensed and is passed into column 3 as reflux liquid. The methane-rich fraction vaporized in heat exchanger 17 is finally heated in heat exchanger 13 and reunited with the also vaporized ethylene-rich fraction. The cycle gas now passes in its original composition by way of conduit 18 to heat exchanger 8, where it is heated, and back to the compressor.

Figure 2:
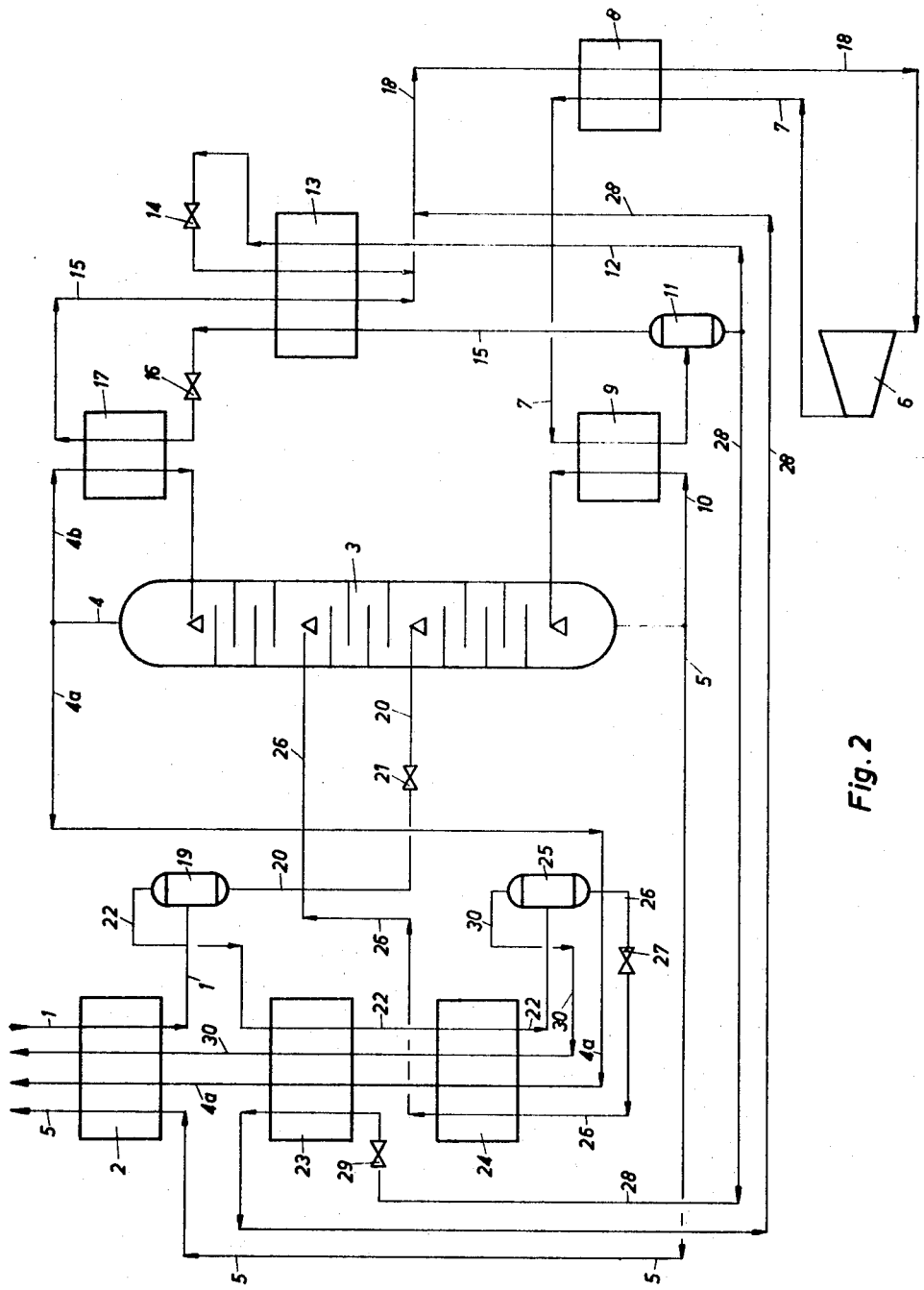

The process according to FIG. 2 concerns a broadening of the above-described process. Here the cycle gas yields additional cooling at an average temperature level at the column. The reference numerals 1 to 18 of FIG. 1 designate the same parts of the equipment.

The crude gas to be decomposed, a $CH_2$-$C_2H_4$ mixture, is conducted by way of conduit 1 through heat exchanger 2, where the heavy constituents are condensed for the most part. They are separated in separator 19. The liquid fraction containing mainly $C_2H_4$ passes by way of conduit 20 and choke valve 21 into column 3. The gas phase is conducted from separator 19 by way of conduit 22 through heat exchangers 23 and 24 into separator 25. In this manner the heavy constituents of the gas mixture are condensated, and there results in separator 25 a liquid phase with $C_2H_4$ and very much $CH_4$, while only traces of $C_2H_4$ remain in the gas phase. In order to be able to carry out in the column 3 and energy-conserving rectification, i.e., to fit the load lines to the line curve of the equilibrium curve, the liquid fraction is conducted to column 3 from the separator 25 as liquid-gas mixture. It is therefore removed from separator 25 by way of conduit 26, expanded in choke valve 27, partially vaporized in heat exchanger 24, and passed into column 3.

A cold balance at the equipment group 23, 24, 25, i.e., the second separation step, now yields a deficit, since liquid is drawn from this step. This deficit is covered by the multicomponent mixture cycle. From separator 11 a part of the liquid phase is branched off from conduit 12 and flows into heat exchanger 23 by way of conduit 28 and expansion valve 29. Here it is smoothly vaporized above the temperature, adjusting to the temperature course of the condensing crude gas. The vapors flow back by way of conduit 28 and are reunited with the other expanded components of the gas cycle.

The ethylene-free residual gas and the ethylene-free top product of column 3 are drawn out by way of conduit 30 and conduit 4—4a, respectively, through heat exchangers 23, 24 and 2 from the equipment. The remaining part of the equipment and the further introduction of the multicomponent mixture cycle corresponds entirely to that illustrated in FIG. 1.

The exemplified embodiments show the improvement of the process of this invention in comparison to the known processes:

The pressure difference to be raised by the compressor amounts to 18 absolute pressure maximum, while previously with respect to only a cycle for the simultaneous adsorption layer heating and top cooling at least 30 absolute pressures were needed.

Because of the well-proportioned evaporation and condensation heat, the unrevolved gas amount can be kept considerably smaller.

For adsorption layer heating, intermediate condensation, and deep cooling, as well as for top cooling, there result advantageously designed Q-T diagrams.

What we claim is:

1. In a rectification process for separating mixtures of individual components whose boiling temperatures or vapor pressure curves are far apart wherein for the increasing of the rectification, the column bottom is heated with a circulating refrigerant and the column head is cooled with a circulating refrigerant, the improvement comprising utilizing a multicomponent mixture as the circulating refrigerant, the multicomponent mixture consisting of at least two individual components, compressing and then heating the column bottom, partially condensing the refrigerant mixture and separating it in a separator into a liquid phase having predominantly high boiling components and a vapor phase having predominantly low boiling components, condensing the vapor phase by heat exchange with expanded and vaporizing liquid phase, the condensed vapor phase cooling the column head after expansion to the suction pressure of the compressor, mixing the separated refrigerant components, and conducting the component mixture to the compressor.

2. The process of claim 1 wherein the bottom heating and head cooling are achieved by utilizing at least two cascading gas cycles, and at least one of the cascading cycles being a multicomponent mixture cycle with mixture separation being by partial condensation.

3. The process of claim 1, wherein after the first separation step the phase in vapor form is only partially condensed by heat exchange with the expanded and vaporizing liquid phase, whereupon the partially condensed phase is separated into a vapor and a liquid phase in a second separator corresponding to the process in the first step, and proceeding so far as in the first step until finally after a last step a last liquid phase occurs on the coldest temperature level at which the column head is cooled.

4. The process of claim 2 wherein after the first separation step the vapor phase is only partially condensed by heat exchange with the expanded and vaporizing liquid phase, whereupon the partially condensed phase is separated into a vapor and a liquid phase in a second separator corresponding to the process in the first step, and proceeding so far as in the first step until finally after a last step a last liquid phase occurs at the coldest temperature level with which the condensed cycle gas of an after-switched cascade cycle is condensed.

5. The process of claim 2, wherein after the first separation step the phase in vapor form is only partially condensed by heat exchange with the expanded and vaporizing liquid phase, whereupon the partially condensed phase is separated into a vapor and a liquid phase in a second separator corresponding to the process in the first step, and proceeding so far as in the first step until finally after a last step a last liquid phase occurs on the coldest temperature level at which the column head is cooled.

6. The process of claim 5 wherein the cold output at the column takes place in several steps at various temperature levels.

7. The process of claim 6 wherein the multicomponent mixtures are composed of components of the mixture to be decomposed.

8. The process of claim 7 wherein the multicomponent mixture cycles are closed cycles.

9. The process of claim 7 wherein at least one of the multicomponent mixture cycles is an open cycle wherein a fraction of the last and the intermediate fractions is passed directly into the column and the thus used-up cycle component is replaced by a corresponding decomposition product.

10. The process of claim 7, wherein the mixture to be decomposed consists essentially of methane and ethylene.

11. The process of claim 10 wherein a portion of the liquid ethylene-rich fraction is separated in a separator after expansion in a choke valve and contributes to the partial condensation of the crude gas in a heat exchanger.